(12) United States Patent  (10) Patent No.: US 9,284,125 B2
Laughlin  (45) Date of Patent: Mar. 15, 2016

(54) WING PULLEY HAVING CENTRAL REINFORCING DISK

(71) Applicant: Precision, Inc., Pella, IA (US)

(72) Inventor: Leo J. Laughlin, Pella, IA (US)

(73) Assignee: Precision, Inc., Pella, IA (US)

( * ) Notice: Subject to any disclaimer, the term of this patent is extended or adjusted under 35 U.S.C. 154(b) by 60 days.

(21) Appl. No.: 14/285,696

(22) Filed: May 23, 2014

(65) Prior Publication Data

US 2014/0251761 A1   Sep. 11, 2014

Related U.S. Application Data

(63) Continuation-in-part of application No. 12/823,528, filed on Jun. 25, 2010, now abandoned, and a continuation of application No. 13/010,286, filed on Jan. 20, 2011, now Pat. No. 8,739,965.

(51) Int. Cl.
*B65G 39/10* (2006.01)
*B65G 23/04* (2006.01)
*B65G 39/07* (2006.01)

(52) U.S. Cl.
CPC .............. *B65G 23/04* (2013.01); *B65G 39/07* (2013.01); *B65G 2207/48* (2013.01)

(58) Field of Classification Search
USPC ................................. 198/835, 494
See application file for complete search history.

(56) References Cited

U.S. PATENT DOCUMENTS

| | | | |
|---|---|---|---|
| 1,335,421 A | 3/1920 | Black | |
| 1,691,993 A * | 11/1928 | Rogers | F16H 55/40 474/185 |
| 1,980,777 A | 11/1934 | Zollinger | |
| 2,236,027 A * | 3/1941 | Bowen | F16H 55/44 474/175 |
| 2,787,913 A * | 4/1957 | Hageline | B65H 57/14 198/834 |
| 3,038,590 A | 6/1962 | Arndt | |
| 3,046,805 A | 7/1962 | Van Gorp | |
| 3,055,229 A * | 9/1962 | Mecham | B65G 39/073 198/494 |
| 3,354,735 A | 11/1967 | Holz | |
| 3,661,246 A * | 5/1972 | Faunce | B65G 39/071 198/806 |
| 3,809,211 A * | 5/1974 | Padilla | B65G 21/00 198/501 |
| 3,848,743 A * | 11/1974 | Danberg | B03C 1/16 198/494 |
| 3,995,487 A * | 12/1976 | Locke | B65G 39/073 198/835 |
| 4,159,055 A | 6/1979 | Eberle | |
| 4,180,155 A | 12/1979 | Stevick | |
| 4,233,853 A | 11/1980 | Holz | |
| 4,284,409 A | 8/1981 | Van Teslaar | |
| 4,430,057 A | 2/1984 | Hoover et al. | |
| 4,643,294 A | 2/1987 | Whited | |
| 4,718,544 A | 1/1988 | Herren | |
| 4,836,361 A * | 6/1989 | Herren | B65G 39/02 198/843 |
| 4,956,914 A * | 9/1990 | Valster | B65G 39/073 29/892.1 |
| 4,984,363 A | 1/1991 | Valster et al. | |
| 5,109,976 A | 5/1992 | Mohri et al. | |

(Continued)

OTHER PUBLICATIONS

CEMA Standard 501.1, Specifications for "Welded Steel Wing Pulleys", Conveyor Equipment Manufacturers Association, BSR/CEMA 501.1-2003 (R2009) (Reaffirmation of ANSI/CEMA 501.1-2003) (5 pages).

(Continued)

*Primary Examiner* — Joseph Dillon, Jr.
(74) *Attorney, Agent, or Firm* — Armstrong Teasdale LLP

(57) ABSTRACT

Wing pulleys that engage a conveyor belt during conveying operations are described. The wing pulley includes a central reinforcing disk that strengthens and stabilizes the pulley.

17 Claims, 16 Drawing Sheets

(56) References Cited

U.S. PATENT DOCUMENTS

| | | | |
|---|---|---|---|
| 5,190,146 A | 3/1993 | Valster et al. | |
| 5,209,704 A | 5/1993 | Valster et al. | |
| 5,313,771 A * | 5/1994 | France | A01D 46/12 |
| | | | 56/126 |
| 5,421,789 A | 6/1995 | Gregg | |
| 5,454,327 A * | 10/1995 | Goirand | B61B 12/022 |
| | | | 104/173.1 |
| 6,811,020 B2 | 11/2004 | Bailey | |
| 6,935,488 B2 * | 8/2005 | Dow | B65G 23/04 |
| | | | 193/37 |
| 6,938,754 B2 | 9/2005 | Kanaris | |
| 7,070,042 B2 | 7/2006 | Dow et al. | |
| 7,252,473 B2 | 8/2007 | Bailey | |
| 7,527,142 B1 | 5/2009 | Zeltwanger et al. | |
| 7,810,637 B2 * | 10/2010 | Gundlach | B65G 15/64 |
| | | | 198/834 |
| 8,739,965 B2 | 6/2014 | Laughlin | |
| RE45,145 E * | 9/2014 | Zeltwanger | B65G 39/073 |
| | | | 198/494 |
| 8,857,606 B2 * | 10/2014 | Kowalski | B65G 23/04 |
| | | | 198/494 |

OTHER PUBLICATIONS

Co-owned U.S. Appl. No. 13/010,286, filed Jan. 20, 2011, pp. 20.
Non-Final Office Action, U.S. Appl. No. 13/010,286, dated Oct. 10, 2013, pp. 14.
Non-Final Office Action, U.S. Appl. No. 13/010,286, dated May 7, 2013, pp. 7.
Office Action, U.S. Appl. No. 12/823,528, dated Jul. 19, 2013, pp. 8.
Office Action, U.S. Appl. No. 12/823,528, dated Jul. 25, 2013, pp. 9.
Co-owned U.S. Appl. No. 12/823,528, filed Jun. 25, 2010, pp. 19.
Final Office Action, U.S. Appl. No. 12/823,528, dated Dec. 24, 2013, pp. 5.
Notice of Allowance, U.S. Appl. No. 13/010,286, dated Mar. 28, 2014, pp. 5.

* cited by examiner

WING PULLEY HAVING CENTRAL REINFORCING DISK

CROSS-REFERENCE TO RELATED APPLICATIONS

The present application is a continuation-in-part of U.S. patent application Ser. No. 12/823,528, filed Jun. 25, 2010 and is a continuation of U.S. patent Ser. No. 13/010,286, filed Jan. 20, 2011, each of which is incorporated herein by reference.

BACKGROUND

The field of the present disclosure relates to belt conveyor pulleys and, particularly, to wing pulleys that engage a conveyor belt during conveying operations. In various embodiments, the wing pulley includes a central reinforcing disk that strengthens and stabilizes the pulley.

During mining and other bulk transport operations material must be transported over long distances in order to load the material by truck or rail. Further, such material must be unloaded and transported for processing. Among the common means for transport are bulk conveyors which are capable of transporting large amounts of material quickly and reliably and without significant cost. Typical conveyors that may be employed include drag, screw, belt and pneumatic conveyors.

Belt conveyors are well suited for use in many transport applications and are particularly well suited for use in mining operations. Belt conveying systems include at least two pulleys and a conveyor belt which rotates about the two pulleys. Material is loaded onto the belt at a tail section and is unloaded via gravity at a head section. A tail pulley and head pulley allow the belt to travel from the point at which material is loaded to the point it is unloaded and back again. The conveying system may also include take-up pulleys to provide proper belt tensioning, bend pulleys to change the direction of travel of the belt and snub pulleys, typically located adjacent the drive pulley, to increase the contact with the drive pulley and/or provide belt tensioning. The belt may be driven at a number of positions including the tail section or head section of the conveyor system.

At the tail section of the conveying system (the section at which material is loaded onto the conveyor belt), some amount of bulk material may undesirably fall on the lower portion of the belt traveling toward the tail pulley rather than on the upper portion of the belt traveling away from the tail pulley. This material comes into contact with the tail pulley and causes wear of the tail pulley components, and may even lead to pulley failure, resulting in costly downtime and/or replacements. Unless this material is properly discharged, it may be rebroadcast onto the belt causing further wear of the pulley.

A continuing need exists for conveyor pulleys that are capable of discharging unwanted material from the conveyor system without sacrificing pulley strength and reliability relative to conventional pulley designs. A further need also exists for reliable conveying systems and methods for conveying bulk materials that use such conveyor pulleys.

SUMMARY

In one aspect of the present disclosure, a conveyor pulley includes a shaft, a reinforcing disk and a first and second plurality of wings. The shaft includes a central portion, a first coupling portion and a second coupling portion. The first and second coupling portions both extend outward from the central portion. The central portion has a first end and a second end. The reinforcing disk is concentric to the shaft and is attached to the shaft at a point between the first end and the second end of the central portion of the shaft. The first plurality of wings extend from the reinforcing disk to the first end of the central portion of the shaft. The second plurality of wings extend from the reinforcing disk to the second end of the central portion of the shaft.

In another aspect of the present disclosure, a conveyor pulley has a first end, second end, a centerpoint midway between the first end and second end and an axis which extends through the first end and second end. The pulley includes a first plurality of wings that extend from the centerpoint toward the first end and a second plurality of wings that extend from the centerpoint toward the second end. The axis of the pulley and each wing form an angle between about 30° and about 60°.

A further aspect of the present disclosure is directed to a belt conveyor system for transporting bulk materials. The system includes a conveyor belt and a tail section at which bulk material is loaded onto the conveyor belt. The tail section includes a tail pulley around which the conveyer belt is looped. The tail pulley includes a shaft, a reinforcing disk and a first and second plurality of wings. The shaft includes a central portion, a first coupling portion and a second coupling portion. The first and second coupling portions both extend outward from the central portion. The central portion has a first end and second end. The reinforcing disk is concentric to the shaft and is attached to the shaft at a point between the first end and the second end of the central portion of the shaft. The first plurality of wings extend from the reinforcing disk to the first end of the central portion of the shaft and the second plurality of wings extend from the reinforcing disk to the second end of the central portion of the shaft. The system also includes a head section at which bulk material is discharged from the conveyor belt. The head section includes a head pulley around which the conveyor belt is looped.

Another aspect of the present disclosure is directed to a method for transporting bulk material by use of a conveyor system. The system includes a conveyor belt, a tail section and a head section. The conveyor belt has an outer surface and an inner surface. Bulk material is loaded onto the outer surface of the conveyor belt at the tail section. The conveyor belt is looped around a tail pulley and a head pulley. The tail pulley includes a shaft, a reinforcing disk, a first and second plurality of wings and a plurality of contact bars. The shaft includes a central portion, a first coupling portion and a second coupling portion. The first and second coupling portions both extend outward from the central portion. The central portion has a first end and second end. The reinforcing disk is concentric to the shaft and is attached to the shaft at a point between the first end and the second end of the central portion of the shaft. The first plurality of wings extend from the reinforcing disk to the first end of the central portion of the shaft. A second plurality of wings extend from the reinforcing disk to the second end of the central portion of the shaft. Each contact bar is attached to a wing and contacts the inner surface of the conveyor belt upon rotation of the tail pulley. The tail pulley and head pulley are rotated to cause the conveyor belt to rotate and to cause bulk material to travel from the tail section to the head section. Bulk material is discharged from the conveyor belt at the head section.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
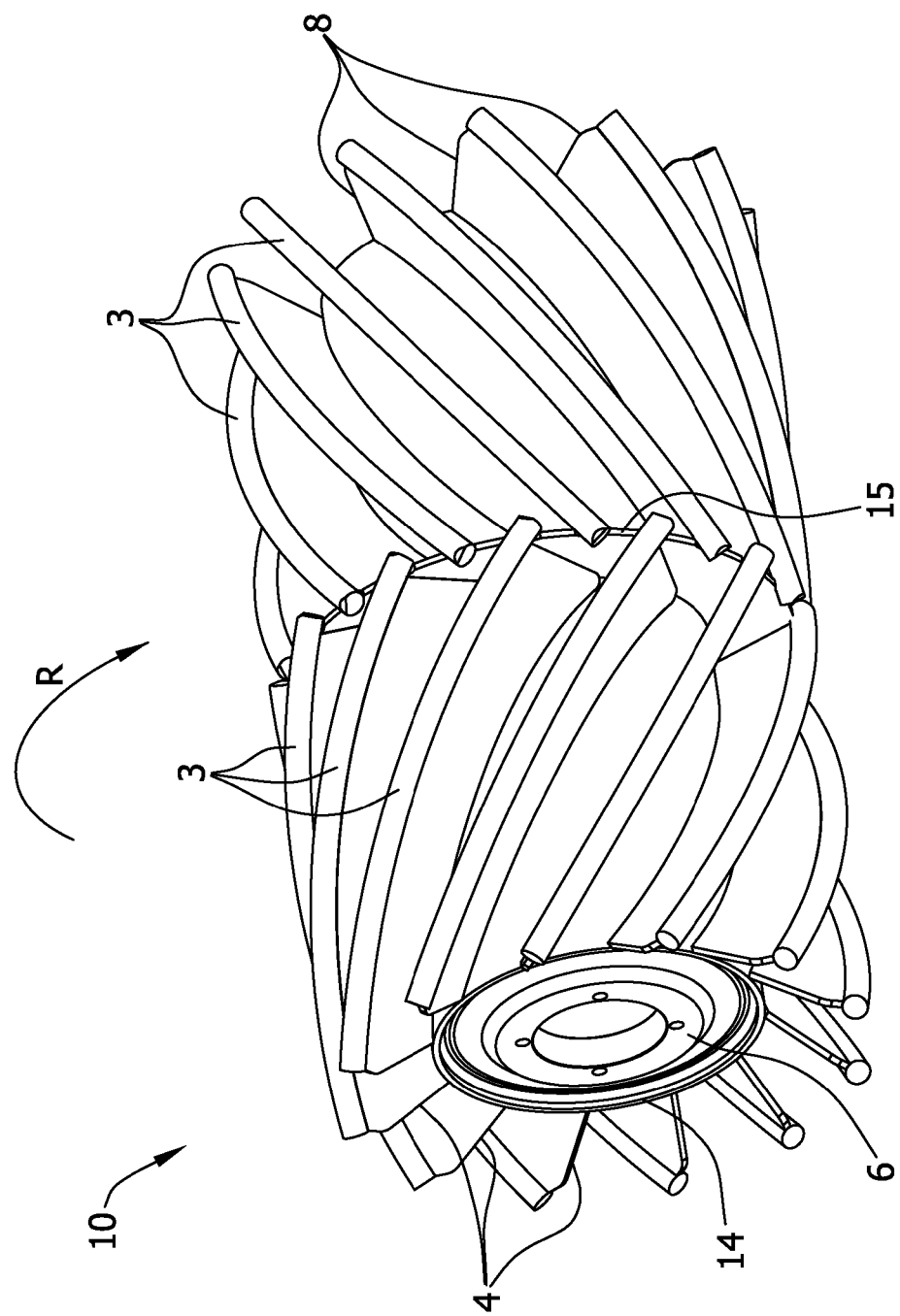
FIG. 1 is a perspective view of a conveyor pulley according to a first embodiment of the present disclosure.

Referring now to FIG. 1, a pulley constructed in accordance with embodiments of the present disclosure is generally designated as "10." The pulley 10 includes a drum 14, a first plurality of wings 4 and a second plurality of wings 8. The wings 4, 8 have contact bars 3 attached thereto. The pulley 10 also includes a first hub 6 and a concentric reinforcing disk 15 discussed further below. A second hub (not shown) similar to the first hub 6 is included at the end of the pulley 10 opposite the first hub 6. The pulley 10 has a direction of rotation R as shown in FIG. 1.

Figure 2:
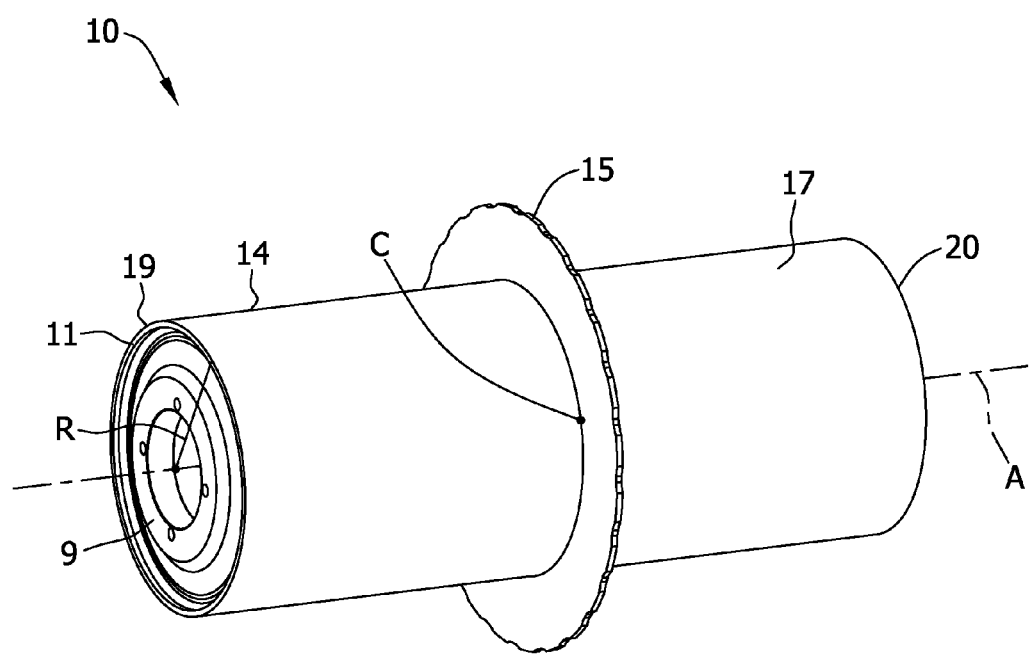
FIG. 2 is a perspective view of the conveyor pulley with wings and contact bars removed for clarity.

The pulley 10 is shown in FIG. 2 with the wings 4, 8 and contact bars 3 not shown for clarity. The drum 14 has an imaginary central axis A about which it rotates and is composed of an annular wall 11. The annular wall 11 has an inner surface 9 and outer surface 17 and a first end 19 and second end 20. The annular wall 11 has an inner radius (not shown) that extends to the inner surface 9 and an outer radius R that extends to the outer surface 17. The reinforcing disk 15 is attached to the outer surface 17 of the annular wall 11 (e.g., by welding) at a point between the first end 19 and second end 20. The first end 19 and second end 20 define a centerpoint C.

As shown in FIG. 2, the reinforcing disk 15 is attached at the centerpoint C of the drum 14. In this regard, it should be understood that the reinforcing disk 15 may be attached to the drum 14 at positions other than the centerpoint C. Further in this regard, more than one reinforcing disk 15 may be attached to the drum 14 without departing from the scope of the present disclosure. The outer radius R of the annular wall 11 may be selected based on the application in which the pulley 10 is used and the desired rate at which bulk material is removed as appreciated by those of skill in the art. In various embodiments of the present disclosure, the radius R is at least about 3 inches, at least about 5 inches, at least about 10 inches, at least about 20 inches, at least about 35 inches or at least about 50 inches (e.g., from about 3 inches to about 72 inches or from about 5 inches to about 60 inches).

Figure 3:
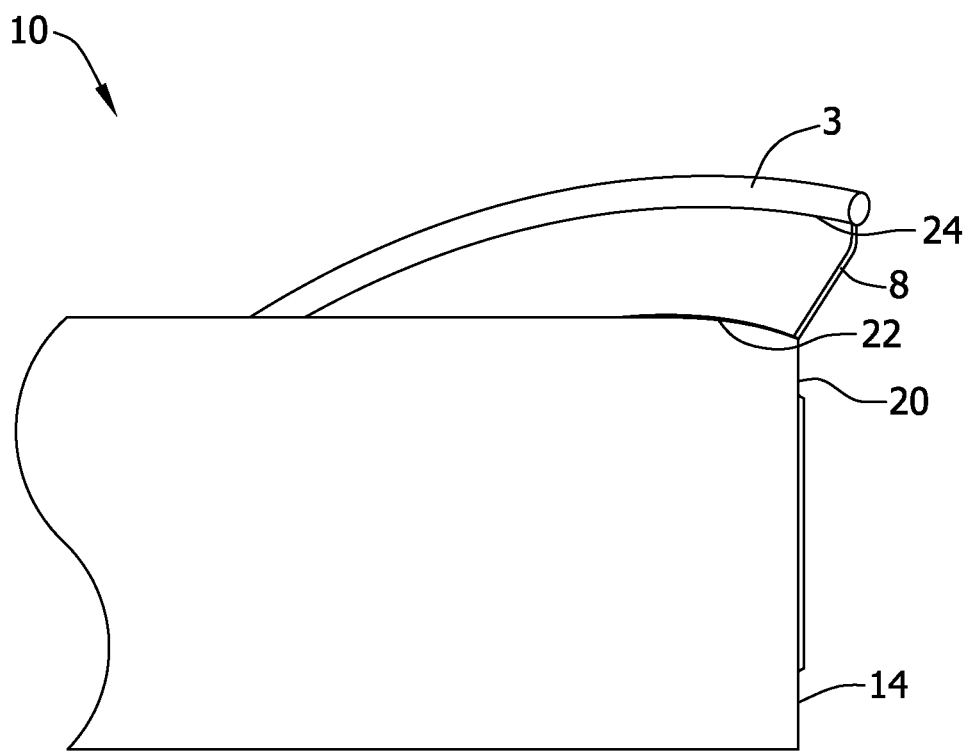
FIG. 3 is an enlarged front view of the conveyor pulley with only one wing shown for clarity.

The first plurality of wings 4 (FIG. 1) extend from the reinforcing disk 15 toward the first end 19 of the drum 14 and the second plurality of wings 8 extend from the reinforcing disk 15 toward the second end 20. Referring now to FIG. 3 in which only one wing is shown for clarity, the wing 8 has a lower end 22 and upper end 24. At its lower end 22 the wing 8 extends to the second end 20 of the drum 14 and at its upper end 24 the wing extends beyond the second end 20. In this regard, it should be understood that the wings 4, 8 of the pulley 10 may be arranged differently than as shown in the Figures. For example, the wings 4, 8 may extend fully beyond the ends 19, 20 of the drum 14 or the wings 4, 8 (including the lower ends 22 and/or upper ends 24) may not fully extend to the first and second ends 19, 20 of the drum.

Figure 4:
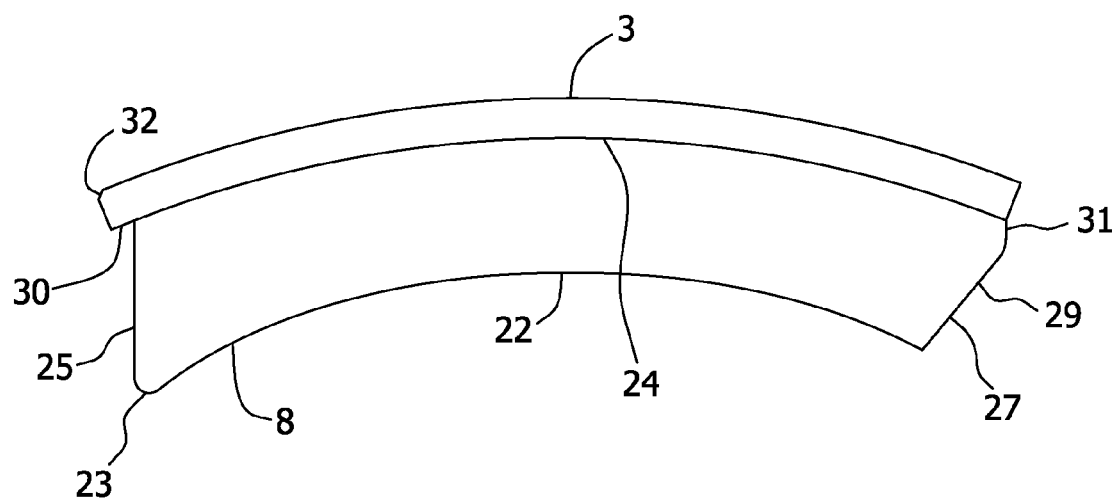
FIG. 4 is a front view of a wing of the conveyor pulley with a contact bar attached thereto.

A wing 8 of the present disclosure is shown in FIG. 4. A contact bar 3 is attached to the upper end 24 of the wing 8 (e.g., by welding). The lower end 22 is attached to the drum 14 (FIG. 3). The wing 8 also includes an inner end 25 which contacts the reinforcing disk 15 (FIG. 1) and an outer end 27 which extends toward a first end 19 or second end 20 of the drum 14. The outer end 27 has an angular portion 29 that extends outward from the lower end 22 towards the upper end 24. The outer end 27 also has an orthogonal portion 31 that is substantially perpendicular to the pulley axis A (FIG. 2). The inner end 25 of the wing 8 is also substantially perpendicular to the pulley axis A. The inner end 25 and lower end 22 may form a rounded corner 23 (i.e., which may be notched rather than rounded) which provides clearance for welds formed between the reinforcing disk 15 and the drum 14 (FIG. 2).

Figure 9:
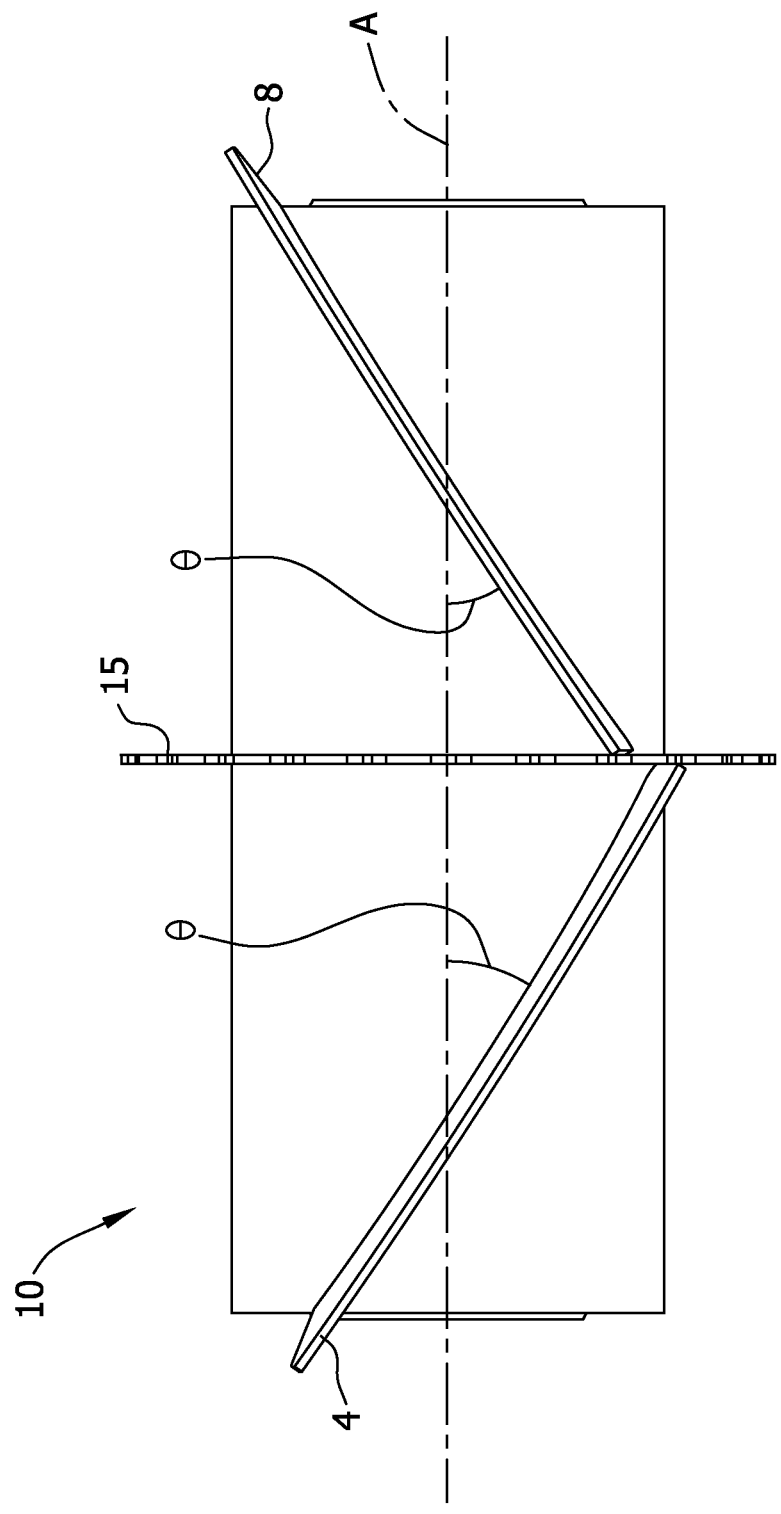
FIG. 9 is a front view of the conveyor pulley with only two wings shown for clarity.

Both the lower end 22 and upper end 24 of the wing 8 are arcuate. The lower end 22 and upper end 24 may be characterized by substantially the same radius of curvature or different radius of curvature may be used. The radius of curvature of the lower end 22 is dependent on the angle at which the wing 8 is offset from the axis A of the pulley (FIG. 9). The lower end 22 may have more than one radius of curvature (and may even contain a linear portion between the two radii of curvature) to conform the lower end 22 to the shape of the drum 14. The lower end 22 may be tapered and one edge or both edges of the lower end 22 may contact the drum 14.

The contact bar 3 has a radius of curvature substantially the same as the upper end 24 of the wing 8. In this regard, it should be understood that the contact bar 3 as manufactured may be substantially linear and the contact bar may be manipulated (e.g., the contact bar may be bent) to conform to the curvature of the upper end 24 while it is attached to the upper end 24 of the wing 8. The contact bar 3 may be arranged such that it curves downward near the reinforcing disk 15 (FIG. 1) to cause the diameter of the pulley 10 to be substantially constant at the center portion of the pulley 10.

In various embodiments of the present disclosure, the height of the wings (e.g., the distance between lower end 22 and upper end 24) may be at least about 1 inch and, in other embodiments, at least about 3 inches, at least about 6 inches or even at least about 9 inches (e.g., from about 1 inch to about 15 inches or from about 2 inches to about 12 inches). Generally, larger wing heights are used when a relatively larger drum 14 diameter is selected, as appreciated by those of skill in the art.

The contact bar 3 includes an overhang portion 30 that extends beyond the inner end 25 of the wing 8. The overhang portion 30 may include a notch 32 which reduces wear on the conveyor belt. The overhang portion 30 may contact the reinforcing disk 15 (FIGS. 1 and 2) at the outer radius of the reinforcing disk and, in some embodiments, is welded to the reinforcing disk. In this regard, it should be understood that the contact bar may contact the reinforcing disk without being attached (e.g., welded) thereto. The inner end 25 of the wing 8 may also be welded to the reinforcing disk 15.

Attachment of the contact bars 3 and/or the wings 4, 8 to the reinforcing disk 15 (FIG. 1) adds strength to the pulley and prevents the wings 4, 8 from folding and/or breaking from the drum 14. It has been found that pulleys 10 that include a reinforcing disk 15 and drum 14 are generally stronger and more durable than pulleys which do not have a reinforcing disk but rather include strengthening gussets between the wings and/or that do not include a drum but rather attach the wings directly to the hub portion of the pulley. Locating the reinforcing disk 15 inward from the first end 19 and second end 20 (i.e., not locating one or more reinforcing disks at the first end 19 or second end 20) allows stray bulk material traveling on the underside of the conveyor belt to be more readily expelled from the pulley 10 upon contact with the pulley. As shown in the Figures, the pulley 10 does not include gussets (i.e., is "gusset-free") and includes a central drum 14 which allows for a more robust construction.

Figure 5:
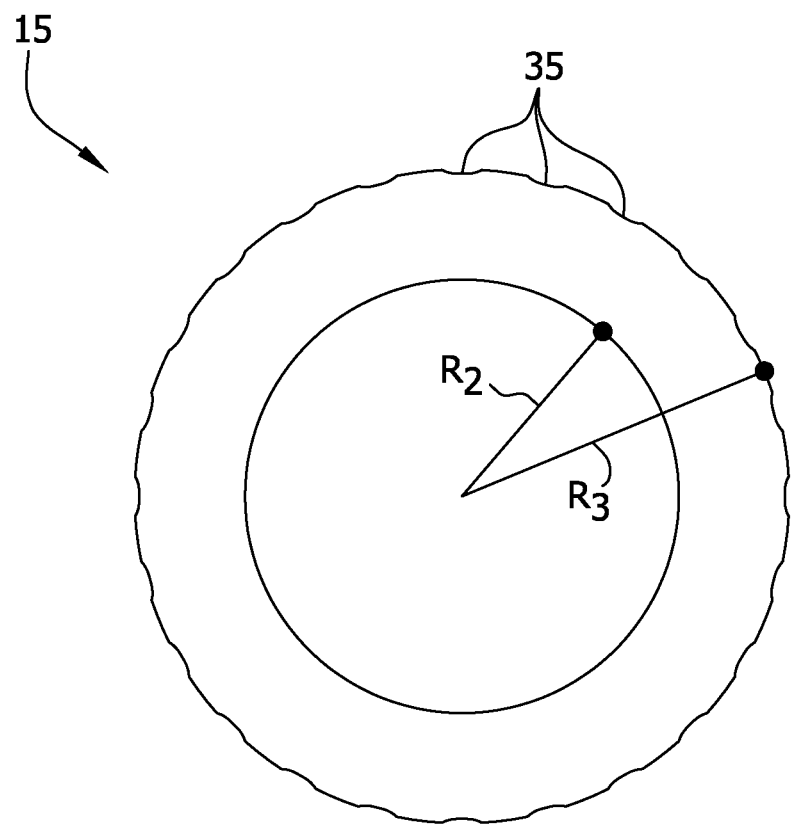
FIG. 5 is a side view of the reinforcing disk of the conveyor pulley.
Figure 6:
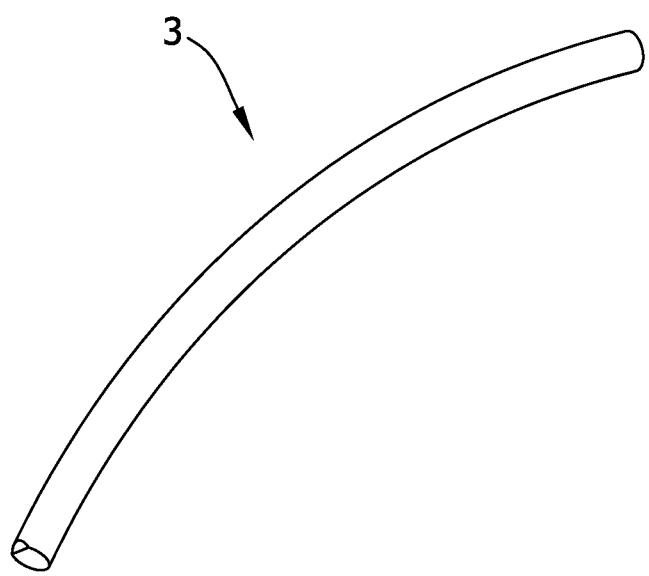
FIG. 6 is a perspective view of a contact bar according to a first embodiment of the present disclosure.
Figure 7:
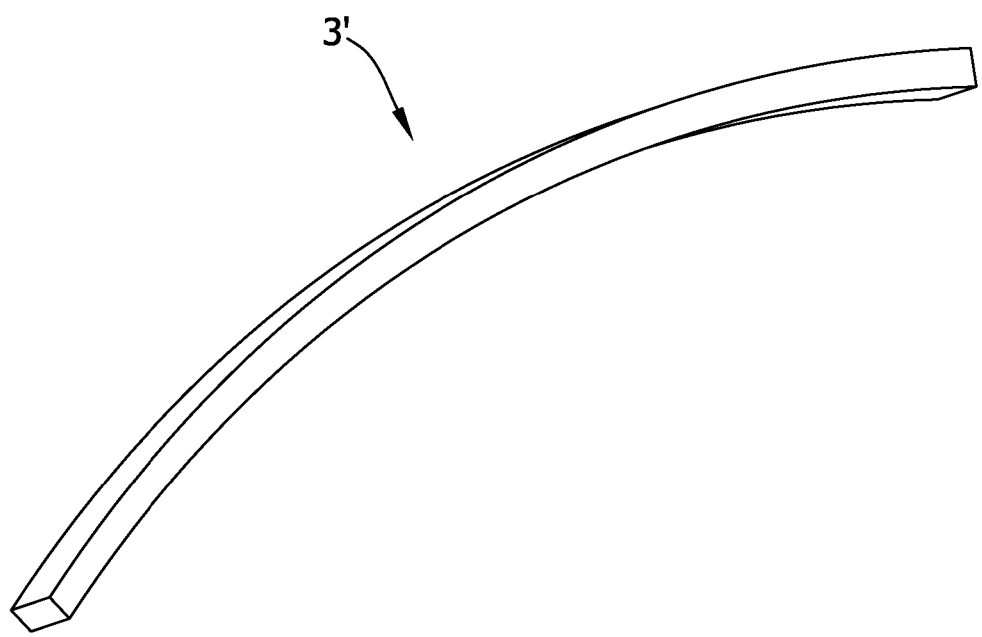
FIG. 7 is a perspective view of a contact bar according to a second embodiment of the present disclosure.
Figure 8:
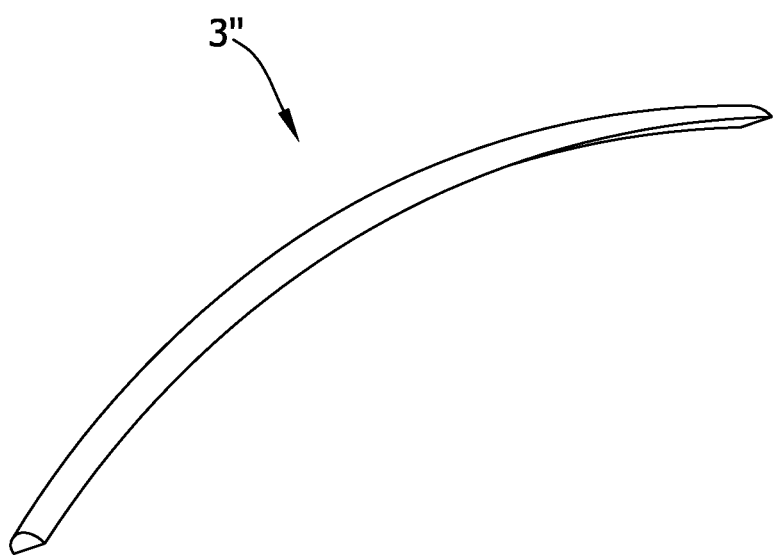
FIG. 8 is a perspective view of a contact bar according to a third embodiment of the present disclosure.

Referring now to FIG. 5, the reinforcing disk 15 is generally an annulus having an inner radius $R_2$ and an outer radius $R_3$. The reinforcing disk 15 is attached to the drum 14 (FIG. 2) at the inner radius $R_2$. The reinforcing disk 15 includes a plurality of notches 35 that generally conform to the size and shape of the contact bars 3 (FIG. 1). As shown in FIG. 6, the contact bar 3 is generally round in shape and, for this reason, the notches 35 (FIG. 5) are generally arcuate. It should be understood that the contact bars 3 may take any number of a variety of shapes including, for example, rectangular bars 3' (FIG. 7) and partial circles 3" (FIG. 8).

The wings 4, 8 of the pulley 10 may be attached to the pulley by placing the overhang portion 30 of the contact bar 3 (FIG. 4) into a notch 35 of the reinforcing disk 15 (FIG. 5). The inner end 25 (FIG. 4) may be brought flush with the reinforcing disk 15 (FIG. 2) and the lower end 22 (FIG. 4) brought flush with the drum 14 (FIG. 2). In this manner, the reinforcing disk 15 helps jig the pulley 10 during assembly and no other equipment is required (e.g., the pulley is "self-jigging"). In this regard, it should be understood that extraneous equipment (e.g., one or more jigs) may be used to brace the pulley 10 during assembly without departing from the scope of the present disclosure.

Referring now to FIG. 9, the wings 4, 8 of the pulley 10 are offset from the axis A of the pulley 10 and form an angle θ with axis A. Generally, each of wings 4, 8 form substantially the same angle with the axis A with the first plurality of wings 4 and the second plurality of wings 8 being symmetrically arranged (i.e., configured to generally face one another but in a spaced manner as described below). The angle θ formed between the wings and the axis A may be from about 10° to about 60° and is typically at least 15°. In other embodiments, the angle θ is from about 30° to about 60° or even from about 40° to about 60° which allows material to better be expelled from between the wings during operation and rotation of the pulley 10. Offsetting the wings allows the pulley 10 to expel material as it rotates and helps the belt maintain its proper lateral position.

Figure 10:
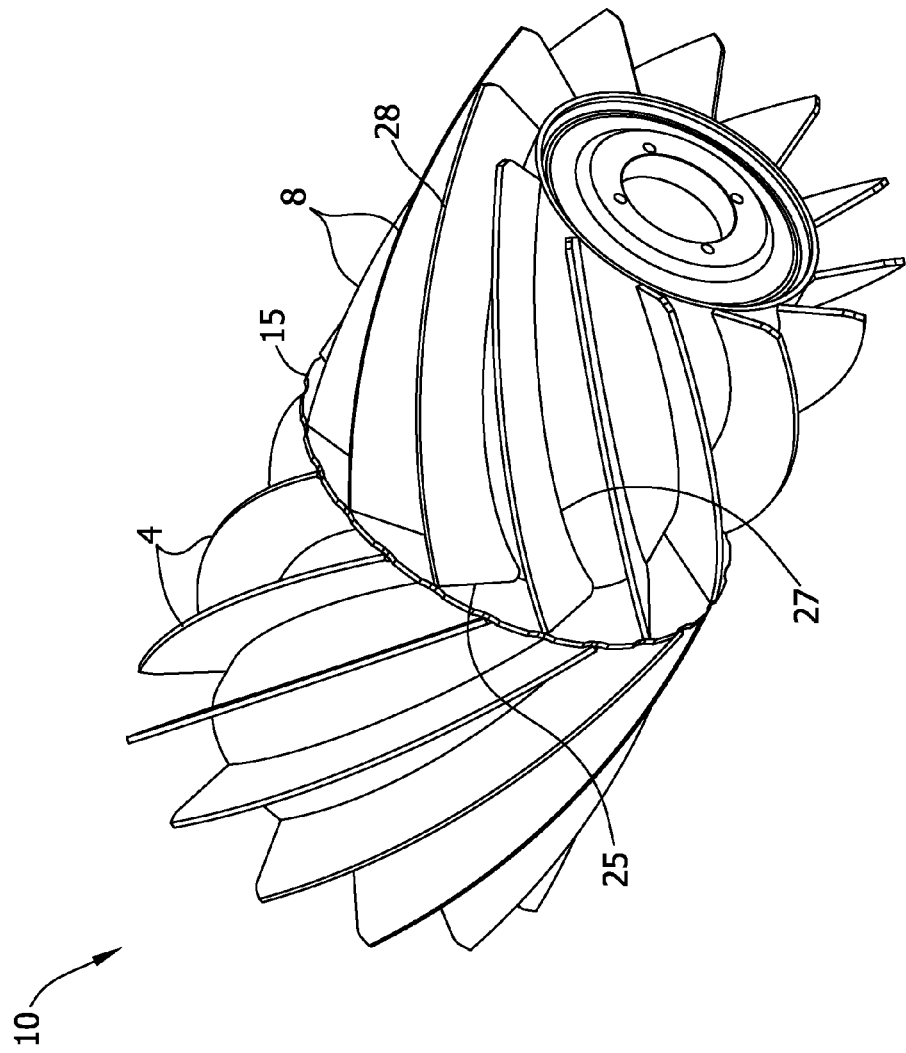
FIG. 10 is a perspective view of the conveyor pulley with the contact bars removed for clarity.

As can be seen from FIG. 1, the first plurality of wings 4 and the second plurality of wings 8 are generally arranged such that each wing is at a circumferential position different than each other wing. For instance and as shown in FIG. 10 in which the contact bars are not shown for clarity, each wing 4 is attached to the reinforcing disk 15 at a different circumferential position than each wing 8 and, in particular, are attached at substantially equally spaced positions. Specifically, the lower end 22 (FIG. 4) of each wing 4, 8 where it meets the reinforcing disk 15 (i.e., at the inner end 25) is at a circumferential position different than the lower ends 22 of each of the other wings 4, 8 and the upper end 24 of each wing 4, 8 where it meets the reinforcing disk 15 is at a circumferential position different than the upper ends 24 of each of the other wings 4, 8. By spacing the circumferential position of each wing 4, 8 rather than having two wings 4, 8 attach to the reinforcing disk 15 at the same circumferential position so as to form a "V", the number of contact points at which the contact bars (FIG. 1) contact the conveyor belt at its center may be increased, which reduces wear of the conveyor belt. Further, the arrangement of the wings 4, 8 allows the pulley to more continually contact the belt during operation which reduces noise and vibration.

Figure 11:
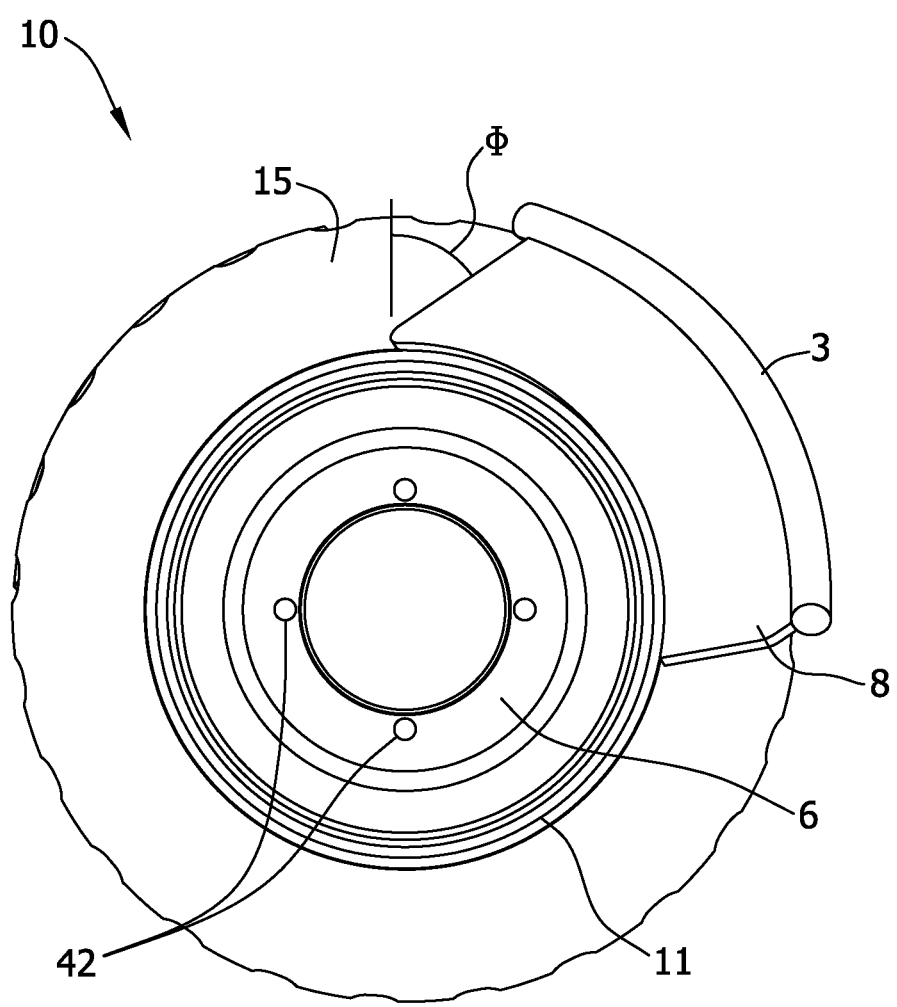
FIG. 11 is a side view of the conveyor pulley with only one wing shown for clarity.

In this regard and as shown in FIG. 11 in which all wings but one are removed for clarity, it should be understood that the inner end 25 of each wing 4, 8 attaches to the reinforcing disk 15 at an angle φ (the value of which depends on the angle θ described above) and, for this reason, a portion of the inner end 25 of each wing 4, 8 may overlap a portion of the inner end of another wing (e.g., the circumferential position of an upper end 24 of a wing where it attaches to the reinforcing disk 15 may be at or near the same circumferential position as the lower end 22 of another wing where it attaches to the reinforcing disk 15) without limitation.

The pulley 10 (shown throughout the Figures) has twenty-four (24) wings 4, 8 (twelve (12) corresponding to the first plurality of wings 4 and twelve (12) corresponding to the second plurality of wings 8); however, it should be understood that the pulley 10 may have more or less wings 4, 8 without limitation. For example and in several embodiments of the present disclosure, the pulley 10 has at least about 4 wings, at least about 8 wings, at least about 16 wings, at least about 24 wings, at least about 36 wings (e.g., from about 4 wings to about 48 wings or from about 16 wings to about 36 wings). In this regard it should be understood that the pulley 10 may include wings in a number other than as described herein, without limitation.

Figure 12:
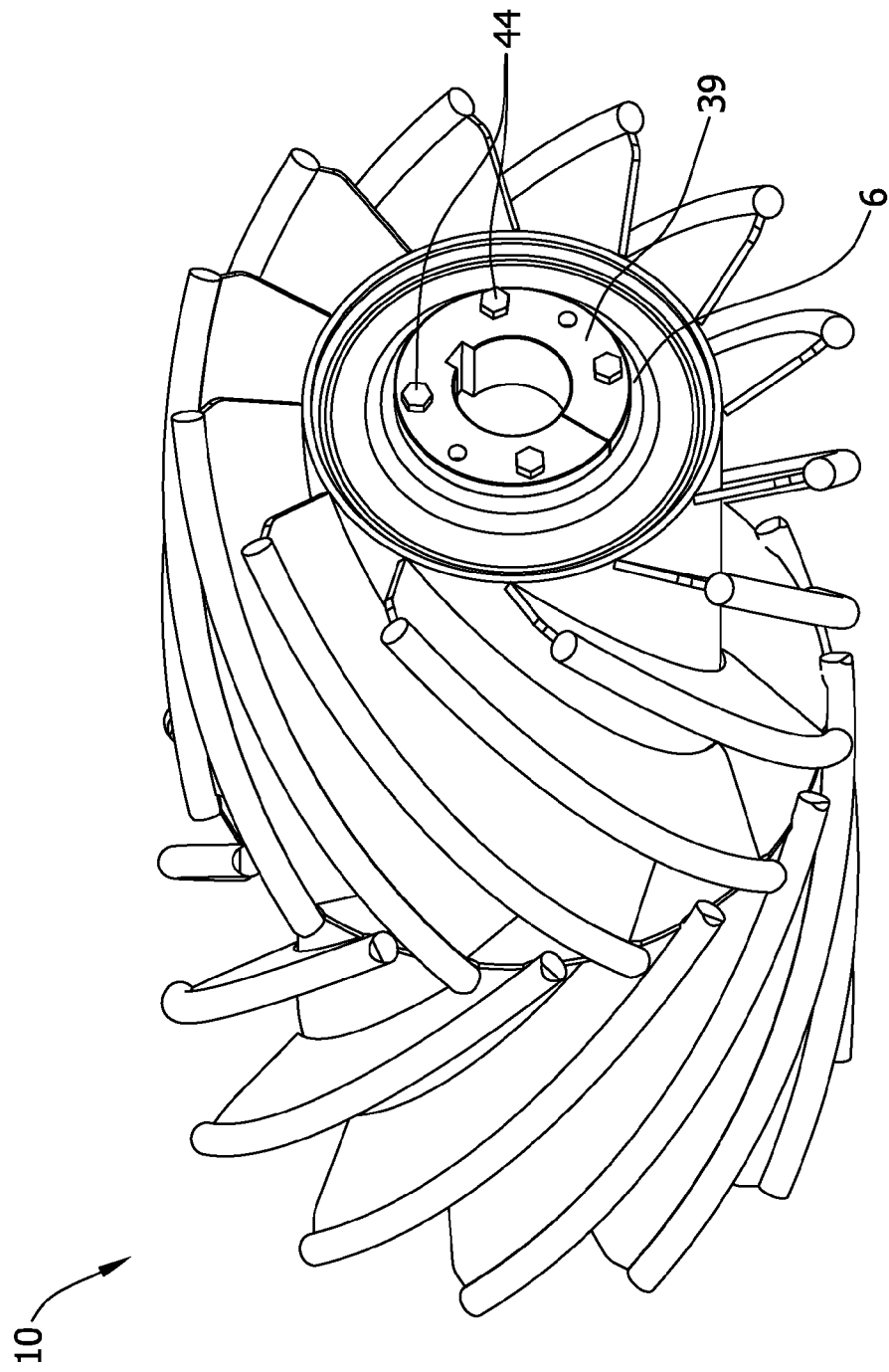
FIG. 12 is a perspective view of the conveyor pulley with a bushing attached thereto.

The pulley 10 includes two hubs 6 that are capable of being attached to a bushing 39 (FIG. 12). A shaft (not shown) is inserted into the bushings 39 and rotated to cause rotation of the pulley 10 and the conveyor belt (not shown). The bushings 39 may be attached to the hubs 6 by the use of threaded sockets 42 (FIG. 11) and bolts 44 (FIG. 12).

Figure 13:
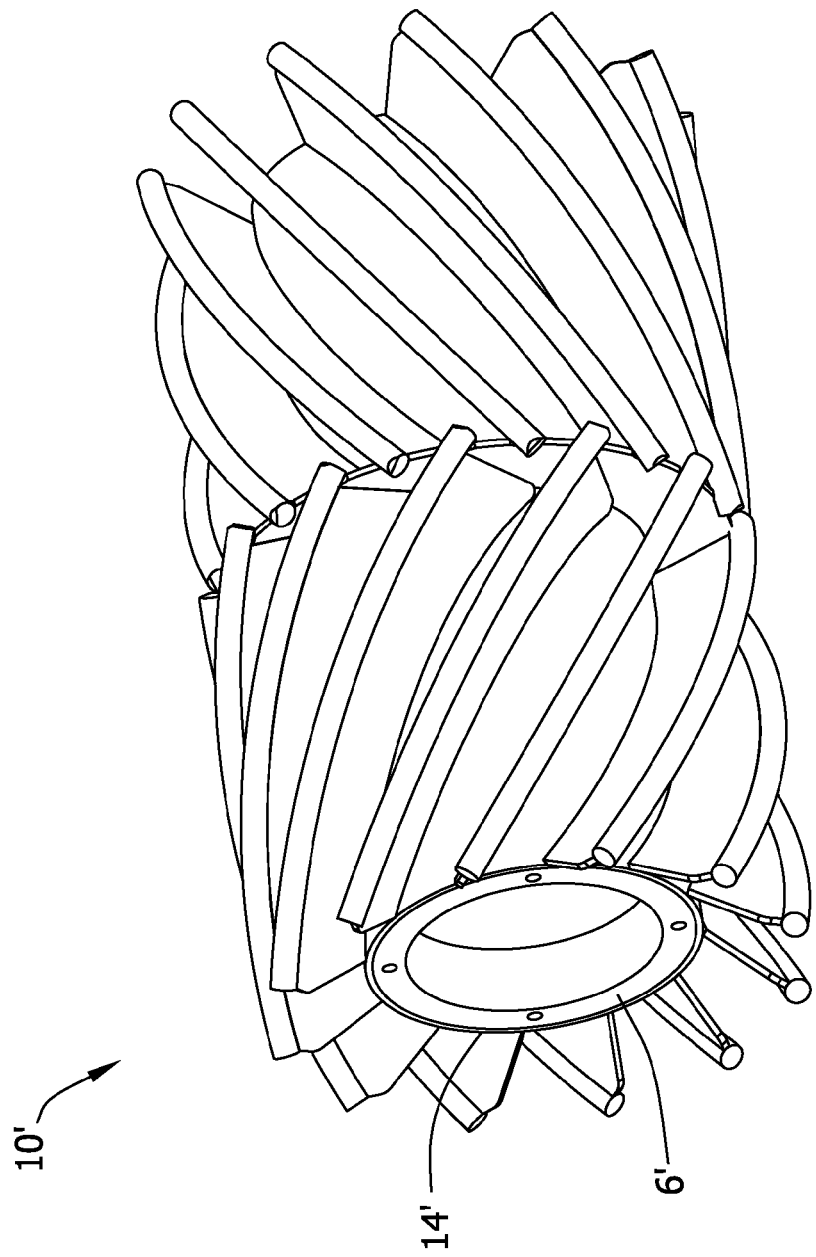
FIG. 13 is a perspective view of a conveyor pulley according to a second embodiment of the present disclosure.

The radius of the hubs 6 is less than the inner radius of the annular wall 11 of the drum 14 such that the hubs 6 may be inset within the drum 14. The hubs 6 may be attached to the inner radius of the drum 14 by, for example, welding. In some alternative embodiments and as shown in FIG. 13, the radius of the hubs 6' is substantially the same as the outer radius of the drum 14' which allows the hubs 6' to extend outward from the drum 14'. In this regard, it should be understood that in the pulley configuration shown in FIG. 13, the drum 14' is commonly referred to as a "tube" in the art. However, as used herein, the terms "drum" and "tube" are interchangeable and use of either should not be viewed in a limiting sense.

Figure 14:
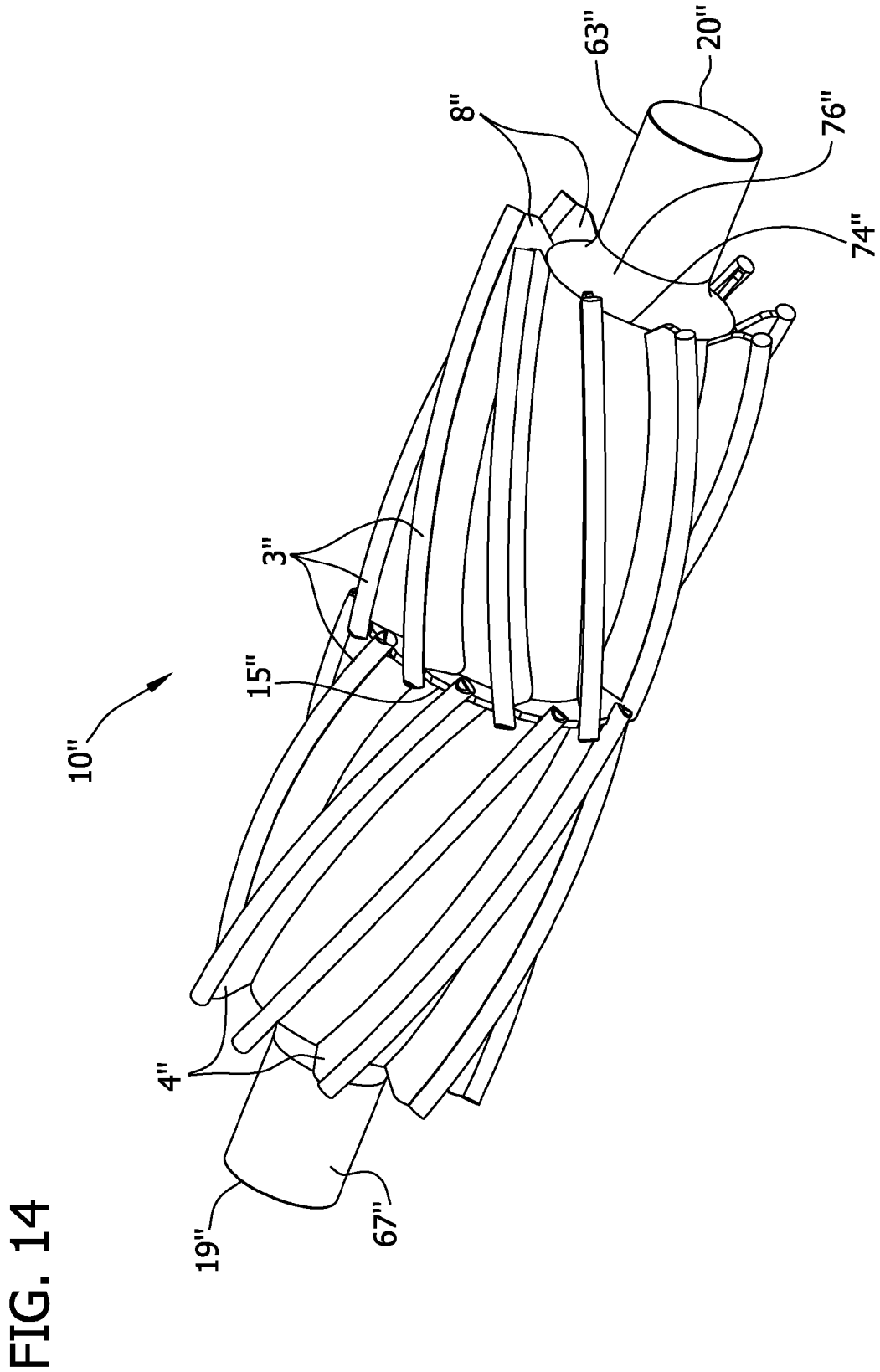
FIG. 14 is a perspective view of a conveyor pulley according to a third embodiment of the present disclosure.
Figure 15:
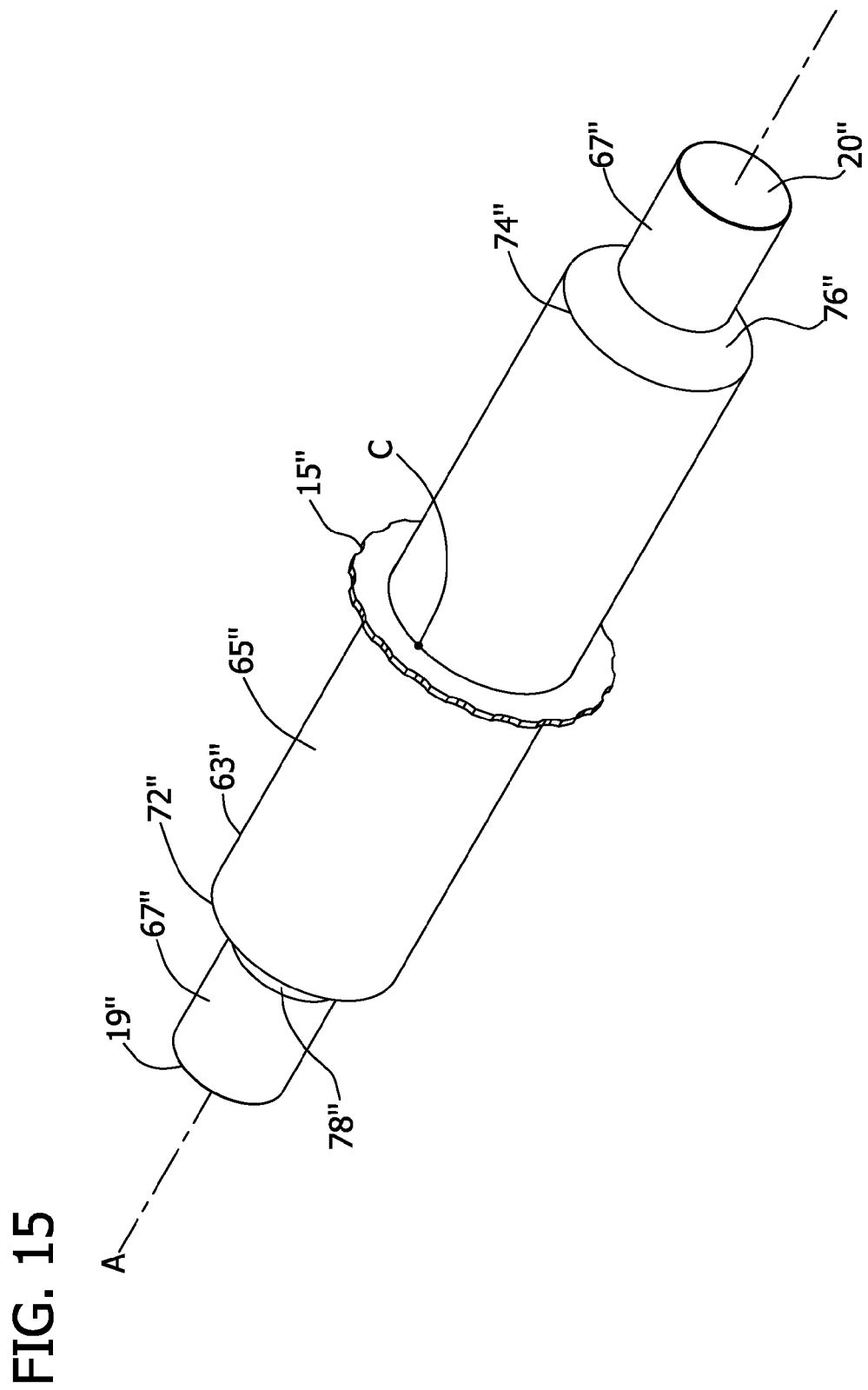
FIG. 15 is a perspective view of the conveyor pulley of FIG. 14 with wings and contact bars removed for clarity.

In several embodiments of the present disclosure and as shown in FIG. 14, the pulley 10" does not include a drum but rather the wings 4", 8" are directly attached to a shaft 63". Referring now to FIG. 15, in which the wings 4", 8" and contact bars 3" are not shown for clarity, the shaft 63" includes a central portion 65" to which the wings 4", 8" (FIG. 14) are attached (e.g., by welding) and includes coupling portions 67" which are used to rotate the pulley 10". The shaft 63" has an imaginary central axis A. The pulley 10" includes a first end 19" and a second end 20" which correspond to the respective ends of the shaft 63". The central portion 65" has a first end 72" and a second end 74" to which the wings 4", 8" extend from the reinforcing disk 15". The first end 72" and second end 74" of the central portion 65" define a centerpoint C at which the reinforcing disk 15" is attached to the shaft 63". However, the reinforcing disk 15" may be attached to the shaft 63" at positions other than the centerpoint C. The inner radius of the reinforcing disk 15" and the radius of the shaft 63" at its central portion 65" are substantially equal to facilitate attaching the disk 15" to the shaft 63".

The coupling portions 67" of the pulley 10" generally extend outward from the central portion 65" and outward from the wings 4", 8" (FIG. 14) and may have a diameter less than central portion 65". The shaft 63" may also have one or more diameter-reducing portions 76", 78" which are sloped or curved to gradually reduce the diameter from that of the central portion 65" to the respective diameter of the coupling portions 67". In some embodiments, the diameter of the coupling portions 67" and the central portion 65" are substantially the same. In this regard, the shaft 63" may have additional portions that have a diameter different from the central portion 65" and/or coupling portions 67" without limitation.

The pulley 10" shown in FIGS. 14 and 15 is well suited for high tension applications and, in particular, applications in which a smaller diameter pulley is desirable (e.g., as in some mining applications). By eliminating the tube, (e.g., by directly attaching the wings 4", 8" to the shaft 63") the pulley 10" maintains its strength and durability even at smaller diameters.

It should be understood that the components of the pulley 10 described above may be constructed of any suitable material as appreciated by those of skill in the art. Typically, the components are composed of metal (e.g., carbon steel or stainless steel). The pulley 10 may also include an amount of lagging (e.g., thermoplastic-based material that assists in increasing the coefficient of friction between the pulley and conveyor belt) on the surface of the contact bars 3.

Figure 16:
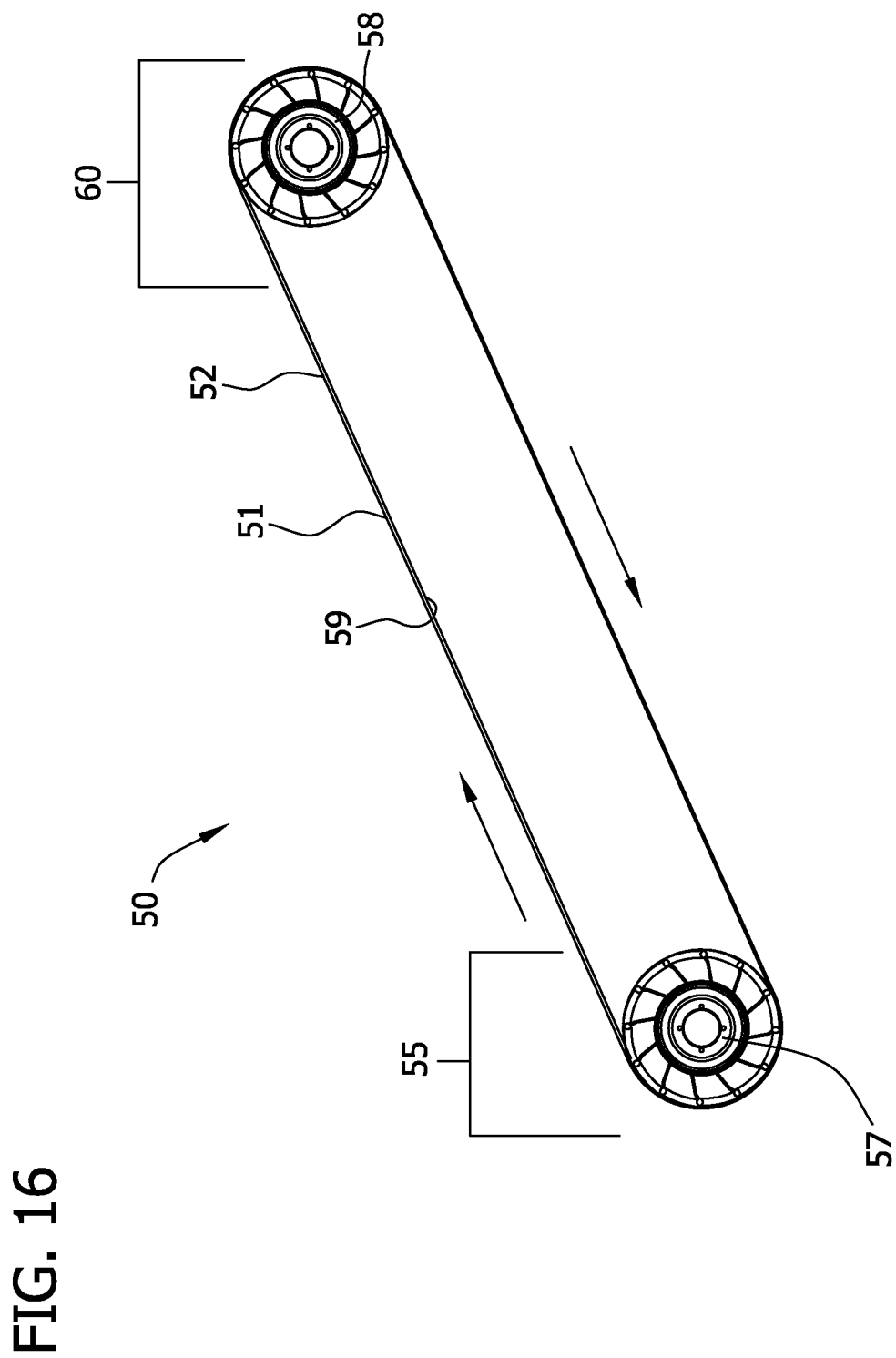
FIG. 16 is a schematic of a belt conveyor system according to a first embodiment of the present disclosure.

The pulley 10 described in the various embodiments above may be used in a belt conveyor system 50 for transporting bulk materials as shown schematically in FIG. 16. The conveyor system 50 has a tail section 55 at which bulk material is loaded and a head section 60 at which bulk material is discharged, typically by force of gravity. The conveyor system 50 includes a conveyor belt 52 which supports the bulk material and which rotates around a tail pulley 57 and a head pulley 58. The bulk material is supported on an outer surface 51 of the conveyor belt 52. An inner surface 59 of the conveyor belt contacts the tail pulley 57 and the head pulley 58. The tail pulley 57 may be substantially the same as described in one or more embodiments above so as to allow bulk material that has fallen onto the inner surface 59 of the conveyor belt to be more readily ejected from the belt system (e.g., by traveling laterally to the direction of the belt upon contact with the tail pulley 57). In this regard, the head pulley may optionally be configured as described above. The head pulley 58 may drive the conveyor belt system 50 (e.g., motor rotation); however, it should be understood that alternatively the tail pulley 57 may drive the system. Further in this regard, the conveyor system 50 may contain pulleys other than as shown (e.g., snub pulleys, bend pulleys, take-up pulleys and the like) which may optionally drive the belt system and/or which may optionally be configured as described above or according to conventional configurations. It should also be understood that the conveyor system 50 is shown for illustration and is not drawn to scale.

In this regard, the conveyor system 50 of FIG. 16 described above may be used in various methods for transporting bulk material. According to several embodiments, bulk material is loaded onto the outer surface 51 of the conveyor belt 52 at the tail section 55. The tail pulley 57 and head pulley 58 are rotated to cause the conveyor belt to rotate and to cause bulk material to travel from the tail section 55 to the head section 60 of the conveyor system 50. Bulk material is discharged from the conveyor belt at the head section 60. In this regard, it should be understood that the term "rotate" as used herein does not imply that that the respective pulley that is rotated is a drive pulley. Rather, rotation may be caused by movement of the conveyor belt 50 which may be driven by any other of the pulleys used in the conveyor system and the term "rotate" should not be considered in a limiting sense.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A conveyor pulley having a first end, second end and an axis which extends through the first end and second end, the pulley comprising:
   a drum or shaft;
   a reinforcing disk between the first end and second end, the reinforcing disk being annular and having an inner radius and an outer radius;
   a first plurality of wings that extend from the reinforcing disk toward the first end; and
   a second plurality of wings that extend from the reinforcing disk toward the second end, each wing of the first and second plurality of wings having a lower end, an upper end, an outer end and an inner end, the lower end being attached to the drum or shaft, the inner end being attached to the reinforcing disk between the inner radius and outer radius of the reinforcing disk;
   wherein the axis of the pulley and each wing form an angle, the angle being between about 30° and about 60° to allow material to be expelled from the pulley.

2. The conveyor pulley as set forth in claim 1 wherein the first end and the second end define a centerpoint midway between the first end and the second end, the reinforcing disk being attached to the shaft generally at the centerpoint.

3. The conveyor pulley as set forth in claim 1 wherein, (1) when comprising a drum, the drum has a first end, a second end and a centerpoint midway between the first end and second end or (2) when comprising a shaft, the shaft comprises a central portion, a first coupling portion and a second coupling portion, the first and second coupling portions both extending outward from the central portion, the central portion having a first end and a second end.

4. The conveyor pulley as set forth in claim 3 wherein the pulley comprises a shaft, the shaft comprising a central portion, a first coupling portion and a second coupling portion, the first and the second coupling portions both extending outward from the central portion, the wings being attached to the central portion.

5. The conveyor pulley as set forth in claim 3 comprising a plurality of contact bars that are attached to the upper end of each wing.

6. The conveyor pulley as set forth in claim 1 wherein each wing is attached to the reinforcing disk at a circumferential position different than each other wing.

7. The conveyor pulley as set forth in claim 1 wherein the wings are spaced apart on the reinforcing disk, the spacing between each wing being substantially equal.

8. The conveyor pulley as set forth in claim 1 wherein the pulley comprises a shaft, a first hub at the first end of the shaft and a second hub at the second end of the shaft.

9. The conveyor pulley as set forth in claim 1 wherein the angle is between about 40° and about 60°.

10. The conveyor pulley as set forth in claim 1 wherein the pulley does not comprise gussets.

11. The conveyor pulley as set forth in claim 1 wherein the pulley comprises a drum.

12. A belt conveyor system for transporting bulk materials, the system comprising:
a conveyor belt;
a tail section at which bulk material is loaded onto the conveyor belt, the tail section including a tail pulley around which the conveyer belt is looped, the tail pulley having a first end, second end and an axis which extends through the first end and second end, the tail pulley comprising:
a drum or shaft;
a reinforcing disk between the first end and second end, the reinforcing disk being annular and having an inner radius and an outer radius;
a first plurality of wings that extend from the reinforcing disk toward the first end; and
a second plurality of wings that extend from the reinforcing disk toward the second end, each wing of the first and second plurality of wings having a lower end, an upper end, an outer end and an inner end, the lower end being attached to the drum or shaft, the inner end being attached to the reinforcing disk between the inner radius and outer radius of the reinforcing disk;
wherein the axis of the pulley and each wing form an angle, the angle being between about 30° and about 60°;
a head section at which bulk material is discharged from the conveyor belt, the head section including a head pulley around which the conveyor belt is looped.

13. The belt conveyor system as set forth in claim 12 wherein, (1) when the tail pulley comprises a drum, the drum has a first end, a second end and a centerpoint midway between the first end and second end or, (2) when comprising a shaft, the shaft comprises a central portion, a first coupling portion and a second coupling portion, the first and second coupling portions both extending outward from the central portion, the central portion having a first end and a second end.

14. The belt conveyor system as set forth in claim 13 wherein the pulley comprises a shaft, the shaft comprising a central portion, a first coupling portion and a second coupling portion, the first and the second coupling portions both extending outward from the central portion, the wings being attached to the central portion.

15. The belt conveyor system as set forth in claim 13 wherein the tail pulley comprises a plurality of contact bars that are attached to the upper end of each wing.

16. The belt conveyor system as set forth in claim 12 wherein the inner end of each wing is attached to the reinforcing disk at a circumferential position different than each other wing.

17. The belt conveyor system as set forth in claim 12 wherein the angle is between about 40° and about 60°.

* * * * *